United States Patent Office 3,847,942
Patented Nov. 12, 1974

---

3,847,942
NOVEL SUBSTITUTED THIETANES AND THEIR PREPARATION
James N. Kellen and Peter E. Throckmorton, Lake, Minn., assignors to Ashland Oil, Inc., Ashland, Ky.
No Drawing. Continuation of application Ser. No. 622,429, Mar. 13, 1967. This application Aug. 3, 1972, Ser. No. 277,757
Int. Cl. C07d 61/00
U.S. Cl. 260—327 R                 6 Claims

ABSTRACT OF THE DISCLOSURE

Novel substituted thietanes of the general formula:

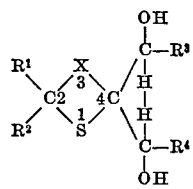

wherein X is

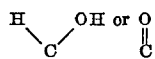

and $R^1$ and $R^2$ being hydrogen when X is

or the same or different hydroxy alkyl or hydroxy aryl alkyl of 1 to 11 carbon atoms when X is

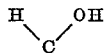

and $R^3$ and $R^4$ are hydrogen or the same or different alkyl or aryl alkyl radicals of 1 to 11 carbon atoms are prepared.

These thietanes are useful in the preparation of polymers, e.g., polyurethanes having excellent physical and chemical properties and a high sustenance to the deleterious effects of ionizing radiation. A greatly preferred compound is 2,2,4,4,-tetramethylol-3-thietanol.

---

This is a continuation of application Ser. No. 622,429, filed Mar. 13, 1967.

The present invention relates to certain novel substituted thietanes and to methods for their preparation. More particularly, this invention relates to hydroxy-, such as alkylol, substituted thietanes.

Hydroxy-substituted compounds such as, for example, polyols are well-known in the resin art as precursors for polymers such as polyesters and polyurethanes. Such polymers can be used to form coatings, self-supporting films, fibers, and laminates. In many instances, these polymers are useful in applications in which they are exposed to ionizing radiation such as that which occurs in the vicinity of atomic reactors. However, the resistance of such polymers to the deleterious effects of ionizing radiation is frequently too low to make them acceptable for such use, despite their superior properties in other respects.

It is therefore an object of the present invention to provide novel hydroxy-substituted thietanes.

Another object of the present invention is to provide novel substituted thietanes useful in the preparation of polymers having excellent physical and chemical properties and a high resistance to the deleterious effects of ionizing radiation.

Yet another object of the present invention is to provide a method for the synthesis of novel substituted thietanes.

Still other objects and advantages of the present invention will be apparent by reference to the following detailed description thereof.

The novel substituted thietanes of the present invention are compounds of formula I:

(I) 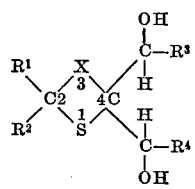

wherein X is

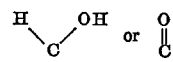

and $R^1$ and $R^2$ being hydrogen when X is

or the same or different hydroxy alkyl or hydroxy aryl alkyl of 1 to 11 carbon atoms when X is

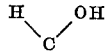

and $R^3$ and $R^4$ are hydrogen or the same or different alkyl or aryl alkyl radicals of 1 to 11 carbon atoms.

and preferably compounds of formula II:

(II) 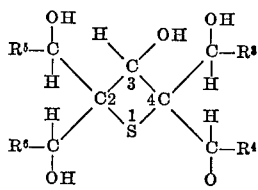

wherein $R^3$ and $R^4$ have the above described meaning, and $R^5$ and $R^6$ are hydrogen or the same or different alkyl or aryl alkyl radicals of 1 to 11 carbon atoms.

A greatly preferred compound of the present invention is 2,2,4,4,-tetramethylol-3-thietanol having formula III:

(III) 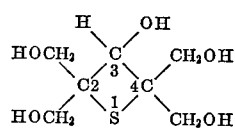

Examples of other specific novel substituted thietanes of the present invention include, among others, cis-2,4-dimethylol-2,4-diethylol-3-thietanol
trans-2,4-dimethylol-2,4-diethylol-3-thietanol
2,2,4,4-tetraethylol-3-thietanol
2,2,4,4-tetrapentylol-3-thietanol
2,2,4,4-tetrabutylol-3-thietanol
2,2-dimethylol-3-thietanone
2,2,4,4-tetramethylol-3-thietanone
4,4-diethylol-3-thietanone
cis-2,4-dimethylol-2,4-diethylol-3-thietanone
trans-2,4-dimethylol-2,4-diethylol-3-thietanone
2,2,4,4-tetraethylol-3-thietanone
2,2,4,4-tetrapentylol-3-thietanone
2,2,4,4-tetrabutylol-3-thietanone The novel substituted thietanes of the present invention can be synthesized by reacting one mole of 3-thietanone with 2 to 5 or more moles of an alkyl or aryl alkyl-aldehyde of 1 to 11 carbon atoms at temperatures between —20° C. and +100° C. and preferably between 0° C. and 30° C. in the presence of a basic catalyst comprising a group 2A metal oxide or hydroxide. Other basic catalysts such as organic amines might also be used, e.g., organic tertiary amines. This synthesis can be illustrated by equations IV, V and VI:

atoms the reactivity of the resultant substituted thietanone can be controlled.

Examples of suitable catalysts include, among others, magnesium oxide, magnesium hydroxide, calcium oxide, and calcium hydroxide, pyridine, and triethylamine.

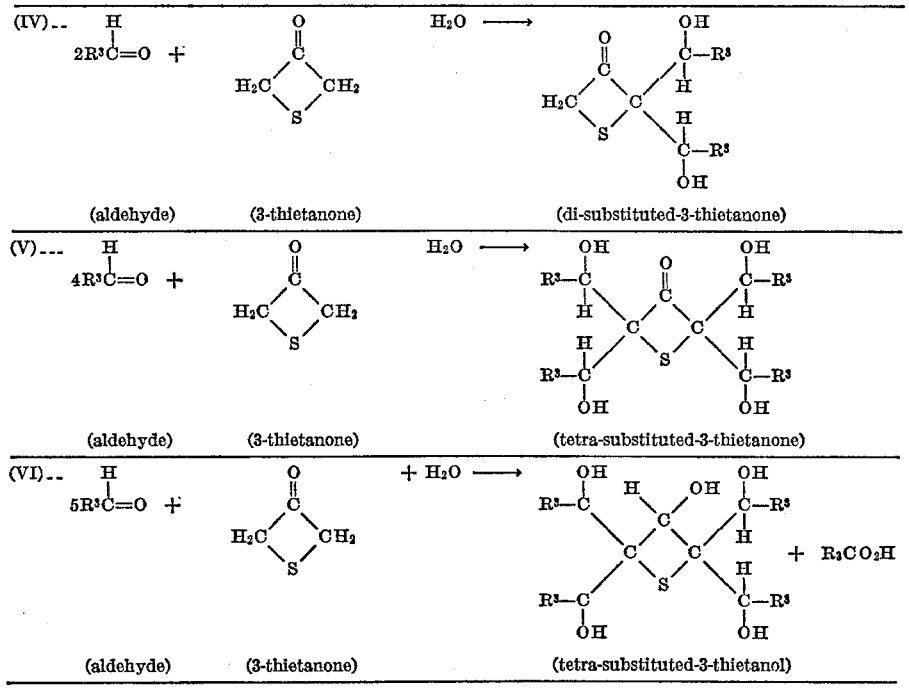

wherein R³ has the above described meaning.

As can be seen by reference to equations IV, V and VI the structure of the substituted thietane is dependent on the number of moles of aldehyde employed. For instance, when 2 moles of alkyl aldehyde are employed a di-substituted thietanone is produced as shown by equation IV. While mono-substituted thietanes are theoretically possible it has been found that mono-substitution enhances the reactivity of the remaining hydrogen atoms such that the di-substituted thietanones predominate. For similar reasons when 2 to 4 moles of alkyl aldehyde are employed the resultant product is a mixture of di- and tetra-substituted thietanones rather than tri-substituted thietanones. When more than 4 moles of an alkyl aldehyde are employed a portion of the pentahydroxy compound of formula II is produced and when 5 moles are employed substantially all the product has the structure of formula II. When employing greater than 5 moles, as for example, 6 or 7 moles, of aldehyde per mole of 3-thietanone, the alkylol groups tend to etherify. Higher temperature such as those above 30° C. and especially those above 50° C., tend to favor this reaction.

Examples of suitable aldehydes include, among others, formaldehyde, acetaldehyde, propionaldehyde, isopropionaldehyde, butylaldehyde, sec-butylaldehyde, furfuryl aldehyde, benzaldehyde and pentyl aldehyde. Formaldehyde, as well as art recognized equivalents thereof such as paraformaldehyde, is particularly preferred since it is the only aldehyde which produces substituted thietanes having primary hydroxyl groups attached to the carbon atoms which is attached to the thietane ring in the 2 and/or 4 positions. Primary hydroxyl groups are preferred over secondary hydroxyl groups since the former are more reactive and consequently facilitate intoduction of the thietane ring into polymers. Although one alkyl aldehyde, R³CHO, is specified in equations IV, V and VI it is apparent that mixtures of alkyl aldehydes can be employed and in this manner R³, R⁴, R⁵, and R⁶ can be the same or different alkyl radicals. For example by employing a mixture of formaldehyde and alkyl aldehydes of 2 to 5 carbon Within the above-specified temperature ranges, the reaction proceeds rapidly with a high yield. Below this range, the speed of reaction is uneconomically slow, while above this range, competing reactions such as the etherification of the hydroxy groups by the alkyl aldehyde reactant take place, reducing the overall yield and at much higher temperatures, the thietane ring opens. The exact temperature at which the thietane ring opens depends, to a large extent, on the substituents on the ring. When four moles or less of aldehyde are employed per mole of 3-thietanone, the carbonyl character of the carbon atom in the 3-position is unchanged and the resultant product is a tetraalkylol-substituted thietanone of formula II.

The 3-thietanone reactant, a known compound, can be prepared by procedures described in Mayer, R., and Funk, K. F., Agnew. Chem., 73,578 (1961); Prinzbach, H., and Veh, G. v., Z. Naturforsch., 16b, 763 (1961), in German cited in Sander, vol. 66, No. 3, Chemical Reviews, 341, 345 (1966).

The novel substituted thietanes of the present invention find utility as precursors for the production of polymers such as polyesters and polyurethanes having increased resistance to the deleterious effects of ionizing radiation. Copending application, Ser. No. 587,695 (ADM–446) to W. J. McKillip and P. E. Throckmorton discloses novel radiation resistant polyurethanes similar to those which can be prepared from the compounds of this invention. The 2,2, 4,4-tetramethylol-3-thietanol is especially useful as a substitute for pentaerythritol in the production of polyesters and polyurethanes since both have the same functionality, i.e. five. Polymers employing the novel substituted thietanes of the present invention are especially useful as structural members in hospital X-ray rooms, nuclear reaction generation plants, and marine propulsion nuclear reactors. Cured laminates of fiberglass with polyurethanes employing the substituted thietanes of the present invention can be fabricated into skis, outboard motorboat hulls, and fishing rods.

This invention is further illustrated by the following examples, in which parts and percentages are by weight unless otherwise specified. It is to be understood that these examples are illustrative of certain embodiments designed to teach those skilled in the art how to practice the invention and to present the best mode contemplated for carrying out the invention, and are not intended to limit the scope of the invention in any manner whatsoever.

EXAMPLE 1

This example illustrates the synthesis of 2,2,4,4-tetramethylol-3-thietanol.

3-Thietanone (3 g., 0.034 mole), paraformaldehyde (5.6 g., 0.187 mole), and water (60 ml.) are placed in a 250 ml., 3-neck, round-bottom flask fitted with a thermometer and a stirrer. The flask is placed in an ice bath and the temperature maintained at about 10° C. Calcium oxide (1 g., 0.021 mole) is added with stirring over a period of about 15 minutes. After the addition of the calcium oxide stirring is continued for one hour. The pH of the solution is then adjusted to 6.8 with 50% formic acid. Stirring is continued for two more hours.

The reaction mixture is then transferred to a 200 ml., round bottom flask and the water is stripped off on a flask evaporator. The residue is taken up in hot methanol and the insoluble salts filtered off and washed with small portions of methanol. The methanol is stripped off, leaving a yellow, sirupy liquid containing the 2,2,4,4-tetramethylol-3-thietanol.

EXAMPLE 2

This example illustrates the synthesis of 2,2,4,4-tetramethylol-3-thietanone.

The procedure of Example 1 is repeated with the single exception that the amount of paraformaldehyde used is 4.1 g., (0.136 moles). Infrared analysis of the resultant product indicates the presence of the carbonyl group.

EXAMPLE 3

The procedure of Example 1 is repeated with the exception that one-half of the paraformaldehyde is replaced with an equimolar amount of acetaldehyde.

EXAMPLE 4

This example illustrates the use of 2,2,4,4-tetramethylol-3-thietane to prepare polyurethane polymers having excellent physical and chemical properties and a high resistance to the deleterious effects of ionizing radiation.

Into a reaction flask placed in an oil bath is charged, under a blanket of nitrogen, toluene diisocyanate (245 g., 1.4 moles), commercially available as "Hylene TM," a 70:30 mixture of ethyl acetate and benzene as solvent (100 ml.) and five drops of benzoyl chloride. A mixture of polyols is prepared employing 2,2,4,4 - tetramethylol-3-thietanol (46.7 g., 0.223 moles), and polypropylene glycol (60.7 g.) having a molecular weight of 425 and hydroxyl number of 256.7, and dissolved in 165 ml. of the above-described solvent. The molar ratio of —NCO to —OH of all reagents is 2:1. The polyol component is added dropwise to the isocyanate component at room temperature (20° C.) with agitation. On completion of the addition of the polyol component, requiring about 90 minutes, the temperature of the reaction mixture rises to about 60° C. The reaction mixture is then heated with continued agitation for a period of one hour at 70° to 80° C. and then allowed to stand for 12 hours. The resulting isocyanate prepolymer solution has a solids content of 60%, a thietane content of 12.6 mol percent (13.3 wt. percent) on 100% solids, and a solution —NCO content of 9.8%.

The above-described isocyanate prepolymer solution is employed to prepare three-ply laminates employing No. 181 glass fabric coated with a beta-aminoalkyl siloxane finish commercially available, for example, as A–1100, by impregnating each ply separately, flashing off solvent from each of the impregnated plies, partially curing the prepolymer by exposing each ply to air at 20° C., 60% relative humidity, combining the three plies in a press for a period of one hour at 90° C. under sufficient pressure to coalesce the plies and create a laminate. The resulting laminate has a glass fiber content of 75%.

The above-described cured laminate exhibits a high resistance to the deleterious effects of ionizing radiation and is useful as a load-supporting structural member in hospital X-ray rooms, nuclear reactor electrical generation plants, and marine propulsion nuclear reactors.

Although the invention has been described in considerable detail with reference to certain preferred embodiments thereof, it will be understood that variations and modifications can be effected within the spirit and scope of the invention as described above and as defined in the appended claims.

What is claimed is:

1. A compound having the formula:

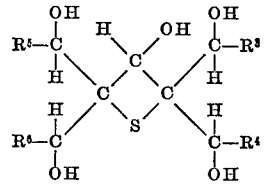

wherein $R^3$, $R^4$, $R^5$, and $R^6$ are hydrogen alkyl, furyl or phenyl.

2. A compound in accordance with claim 1 wherein $R^3$, $R^4$, $R^5$ and $R^6$ are hydrogen.

3. A compound having the formula:

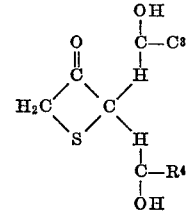

4. A compound in accordance with claim 3 wherein $R^3$ and $R^4$ are hydrogen.

5. A compound having the formula:

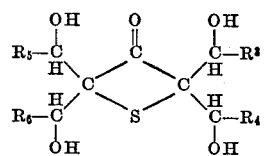

wherein $R^3$, $R^4$, $R^5$ and $R^6$ are hydrogen, alkyl, furyl or phenyl.

6. A compound in accordance with claim 5 wherein $R^3$, $R^4$, $R^5$ and $R^6$ are hydrogen.

References Cited
UNITED STATES PATENTS 3,432,475    3/1969    McKillip et al. _____ 260—77.5

JOHN D. RANDOLPH, Primary Examiner

U.S. Cl. X.R.

117—161 R; 161—190; 204—159.19; 260—2.5, 75 S, 77.5 AT